United States Patent
Hong et al.

(10) Patent No.: US 8,816,849 B2
(45) Date of Patent: Aug. 26, 2014

(54) OVERHANG WARNING DEVICE

(76) Inventors: Andrew L. Hong, Ayer, MA (US);
Lindsay Cannon, Harvard, MA (US);
Mackenzie P. Devlin, Harvard, MA (US); Matthew L. Schmidt, Harvard, MA (US); Jeffrey A. Yates, Groton, MA (US)

( * ) Notice: Subject to any disclaimer, the term of this patent is extended or adjusted under 35 U.S.C. 154(b) by 446 days.

(21) Appl. No.: 13/168,173

(22) Filed: Jun. 24, 2011

(65) Prior Publication Data

US 2011/0316694 A1    Dec. 29, 2011

Related U.S. Application Data

(60) Provisional application No. 61/358,157, filed on Jun. 24, 2010.

(51) Int. Cl.
| | | |
|---|---|---|
| G08B 1/08 | (2006.01) | |
| G08B 23/00 | (2006.01) | |
| G08B 21/00 | (2006.01) | |
| G01C 3/08 | (2006.01) | |
| G01S 15/00 | (2006.01) | |
| G06F 17/10 | (2006.01) | |

(52) U.S. Cl.
USPC ............ 340/539.13; 340/573.7; 340/686.6; 356/3.01; 356/3.11; 367/107; 367/116; 701/301

(58) Field of Classification Search
USPC ............ 340/539.13, 573.7, 825.19, 686.6; 356/3.01; 367/107
See application file for complete search history.

(56) References Cited

U.S. PATENT DOCUMENTS

| | | | |
|---|---|---|---|
| 5,554,975 A | | 9/1996 | Hall et al. |
| 2005/0017869 A1 | * | 1/2005 | Fielmann .................... 340/686.6 |
| 2007/0085993 A1 | * | 4/2007 | Brown, Jr. ......................... 356/3 |
| 2008/0077327 A1 | * | 3/2008 | Harris et al. .................. 701/301 |
| 2008/0088469 A1 | * | 4/2008 | Doemens et al. ........... 340/686.6 |
| 2010/0296076 A1 | * | 11/2010 | Jiang et al. .................... 356/3.11 |

OTHER PUBLICATIONS

Wikipedia, "Arduino," pp. 1-14 [retrieved on May 31, 2011]. Retrieved from the Internet URL: http://en.wikipedia.org/wiki/Arduino.

Dybwad, B., "BAT "K" Sonar Cane—Engadget," pp. 1-4 [retrieved on Aug. 18, 2011]. Retrieved from the Internet URL: http://www.engadget.com/2005/04/07/bat-k-sonar-cane/.

Suntharaja, S., "Smart Can to Help the Blind See," pp. 1-4 [retrieved on Aug. 18, 2011]. Retrieved from the Internet URL: http://thestar.com/my/lifestyle/story.asp?file=/2005/5/29/features/20050529110045&sec=f....

(Continued)

*Primary Examiner* — George A Bugg
*Assistant Examiner* — Jack K Wang
(74) *Attorney, Agent, or Firm* — Hamilton, Brook, Smith & Reynolds, P.C.

(57) ABSTRACT

Suspended or overhanging of obstructions are selectively signaled to an individual by a device that can worn by an individual. The device includes a first sensor that is oriented to selectively detect a suspended or overhanging obstruction at an elevation above the housing and a second distance sensor that is oriented to selectively detect an object at an elevation of the housing. A logic circuit within the housing is electrically connected to the first and second sensors and emits a response if the first sensor is activated, but emits no response if the first and second sensors are both activated. A signaling device electrically connected to the logic circuit is activated upon emission of a response from the logic circuit.

7 Claims, 2 Drawing Sheets

(56) References Cited

OTHER PUBLICATIONS

Gold Coast, "Laser-Guided and Sonar Canes to Help the Blind," pp. 1-2 [retrieved on Aug. 18, 2011]. Retrieved from the Internet URL: http://www.theage.com.au/articles/2003/07/18/1058035174368.html.

Bay Advanced Technologies Ltd (BAT) K—Sonar, "How does 'K' Sonar Work?" pp. 1-3 [retrieved on Aug. 18, 2011]. Retrieved from the Internet URL: http://www.batforblind.co.nz/how-ksonar-works.php.

Stephens, T., "Engineers Develop Assitive Technologies for the Blind," *UC Santa Cruz Currents Online*, [retrieved on Aug. 18, 2011]. Retrieved from the Internet URL: http://currents.ucsc.edu/04-05/12-13/laser.asp.

\* cited by examiner

OVERHANG WARNING DEVICE

RELATED APPLICATIONS

This application claims the benefit of U.S. Provisional Application No. 61/358,157, filed on Jun. 24, 2010.

The entire teachings of the above application(s) are incorporated herein by reference.

BACKGROUND OF THE INVENTION

Visually impaired people employ a variety of assistance devices on the day-to-day basis, the most common of which is the conventional white and red cane. Canes are employed to detect obstructions below waist-level, such as curbs, stones and objects that extend vertically from the ground. However, because canes have a distal end that travels at ground level, they cannot detect obstacles suspended above the ground, such as structural overhangs and low-hanging branches. Other devices have been developed that attach to the cane to provide additional information, but detection of overhanging obstructions generally is not possible employing such devices.

Therefore, a need exists for a device that minimizes or eliminates limitations associated with being able to detect only structures that extend from the ground.

SUMMARY OF THE INVENTION

The present invention is directed to a device for signaling the presence of suspended or overhanging obstructions to an individual.

The device includes a housing that can be worn by an individual. A first sensor is located on the housing that, when the housing is worn by the individual, is oriented to selectively detect a suspended or overhanging obstruction at an elevation above the housing. A second distance sensor on the housing is oriented to selectively detect an object at the elevation of the housing. A logic circuit at the housing is electrically connected to the first and second distance sensors, the logic circuit emitting a response if the first sensor is activated, and not emitting a response if the first and second sensors are both activated. A signaling device is electrically connected to the logic circuit, whereby the signaling device is activated by a response from the logic circuit, thereby selectively signaling the presence of a suspended or overhanging obstruction.

The present invention has many advantages. For example, the device can selectively detect the presence of a structural overhanging obstacle to the path of travel by an individual by providing a tactile signal only when an overhanging obstacle is present. When an obstacle that extends from the ground is detected by the device, even when the height of the obstacle is equal to that of an overhanging obstacle, no signal is given to the individual, the expectation being that the individual would have an alternate means of detecting objects that rise from the ground, such as walls, by use of a conventional device, such as a cane. The device can be fabricated as a single unit that is easily worn by the individual in a convenient location, such as around the neck or in a shirt pocket. The device is inexpensive, and therefore easy to replace, and can be powered by a simple battery.

DETAILED DESCRIPTION OF THE INVENTION

Figure 1:
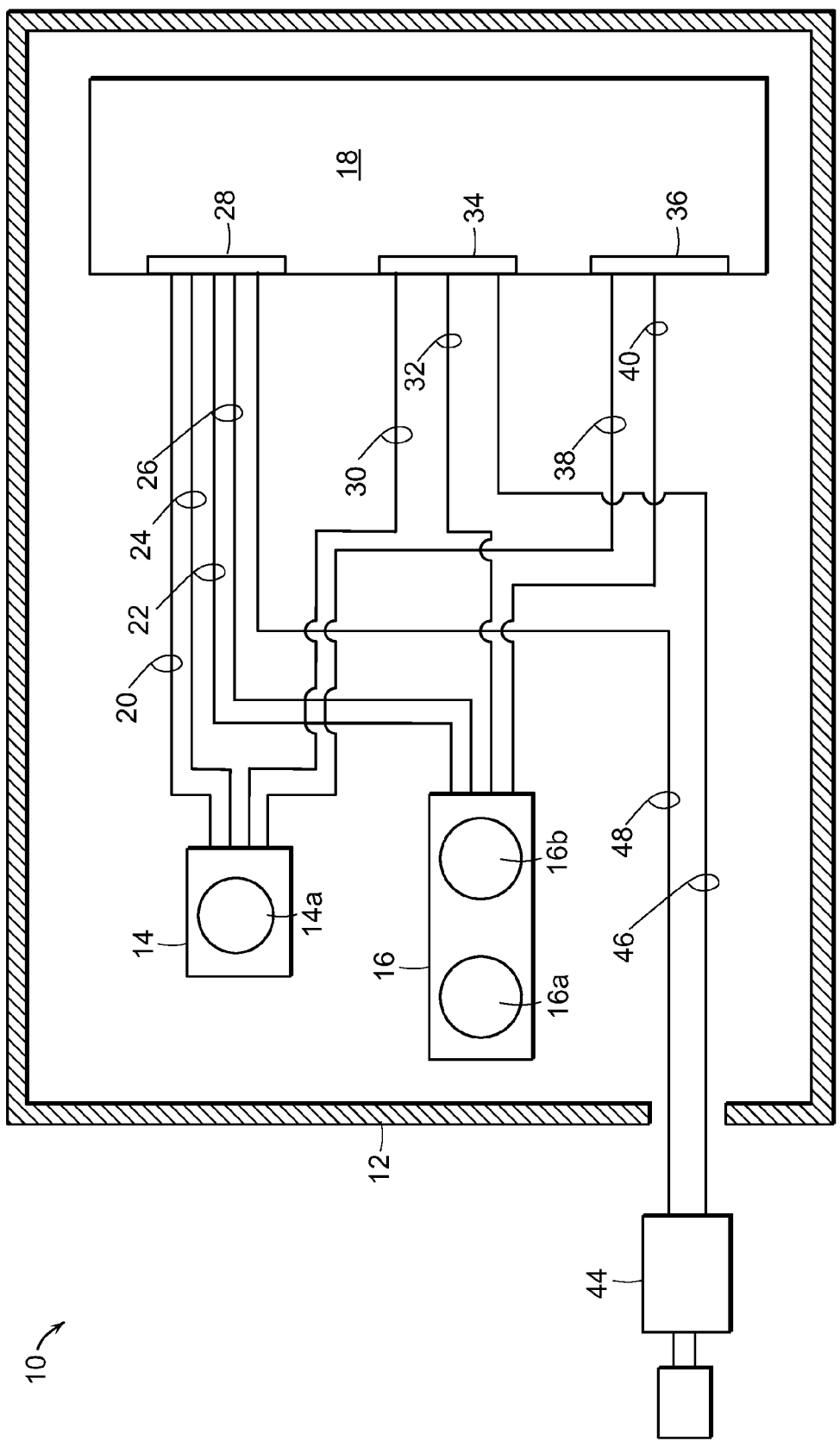
FIG. 1 is a schematic representation of an embodiment of the device of the invention for signaling the presence of suspended or overhanging obstructions in a path traveled by an individual.

The present invention is directed to a device for signaling the presence of suspended or overhanging obstructions in a path of a travel by an individual. In an exemplary embodiment, represented by FIG. 1, device 10 includes housing 12. First distance sensor is mounted on housing 12 and is angled relative to a major vertical axis of the housing, when worn by an individual, to selectively detect a suspended or overhanging obstruction at an elevation above housing 12. Second distance sensor 16 is mounted at housing 12 in an orientation to selectively detect an object at an elevation of the housing when device 10 is being worn by a standing or walking individual.

First distance sensor 14 and second distance sensor 16 each are linked to microcontroller 18 by input leads 20, 22 and output leads 24, 26, respectively, at input/output panel 28 of microcontroller 18. Microcontroller 18 can be, for example, an open-source single-board microcontroller, such as an ARDUINO® open-source single-board microcontroller. Microcontroller 18 includes a general-purpose wiring platform that employs an open hardware design and central processor with a suitable on-board input/output port. Software employed by the processor typically consists of a standard programming language compiler and a boot loader that runs on board microcontroller 18.

Input leads 20, 22 conduct signals from first distance sensor 14 and second distance sensor 16, respectively, to microcontroller 18. Output leads 24, 26 conduct signals from microcontroller 18 to first distance sensor 14 and second distance sensor 16, respectively. An output signal from microcontroller 18 prompts sensors 14, 16, to send out an ultrasonic distance reading pulse. Typically, microcontroller 18 prompts sensors 14, 16 periodically, such as at a rate of about thirty times per second. When the pulse returns from having been reflected by an obstacle, such as a wall or overhang, an input signal relays the return signal from the respective sensors 14, 16 to microcontroller 18. Sensors 14, 16 each have an input pin and an output pin. Also, second sensor 16 preferably includes two point sensors 16a, 16b, because it is believed that a level sensor is more likely to miss an object. It is also believed to be safer for the user to employ two point sensors because the straight sensor is used to prevent unnecessary feedback. Further, it is also preferred that there be only one point sensor 14a which, preferably, has a wide-beam conical range relative to point sensor 16a, 16b, and, therefore, is more likely to detect hazardous objects offset from its focal point.

First distance sensor 14 and second distance sensor 16 also each include electrical ground connection 30, 32, respectively to ground panel 34 of microcontroller 18. First distance sensor 14 and second distance sensor 16 are connected to power source 36 of microcontroller by electrical connections 38, 40, respectively. The power source of microcontroller 18 typically is a direct current power source. In one embodiment, the power source is a five volt battery mounted in microcontroller 18. Alternatively, the power source of device 10 can be remote from microcontroller 18.

Vibratory motor 44 is linked to input/output panel 28 of microcontroller 18 by lead 48. Vibratory motor 44 is also linked ground panel 34 by lead 46. Vibratory motor 44 typically is located in a position that is remote from housing 12 and can be worn anywhere, such as a wrist, of an individual wearing device 10. Alternatively, vibratory motor 44 can be mounted at housing 12 of device 10. In another embodiment, vibratory motor 44 can be substituted with some other sensory perception device, such as an auditory device, which will be activated upon detection by device 10 of an overhanging obstruction.

Figure 2:
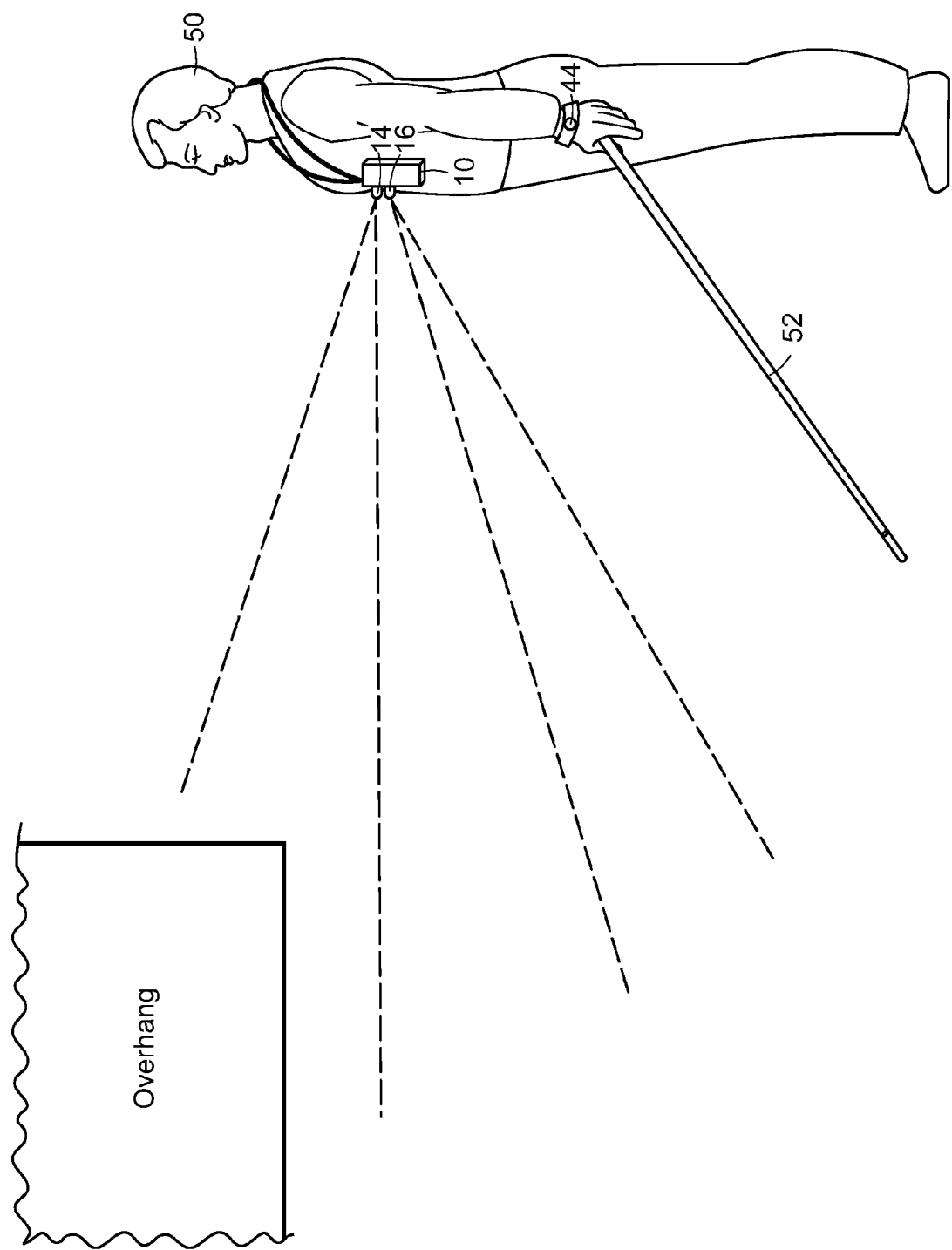
FIG. 2 is a representation of an individual wearing the device of the invention.

As represented in FIG. 2, in operation, an individual 50 employing device 10 will wear the device in a convenient location, such as around the neck of the individual, or in a shirt pocket. As the individual proceeds along a path of travel using cane 52 and device 10, first distance sensor 14, which can be oriented so as to detect objects at or above the level of sensor 14, is activated upon detection of an obstacle in the path of travel of the individual and roughly at or above the elevation of first distance sensor 14. Second distance sensor 16 is oriented to be activated upon detection of an obstacle in the path of travel and at, or, optimally, below the level of second distance sensor 16. Upon activation of either or both of first distance sensor 14 and second distance sensor 16, a signal is sent from each respective sensor through a respective lead to microcontroller 18. If only first distance sensor 14 is activated, while second distance sensor 16 is not activated because the obstacle is an overhanging obstruction, microcontroller 18 will activate vibratory motor 44, through lead 48, thereby alerting an individual that an overhanging obstruction has been detected. As a result, the individual, who is also being assisted by another device, such as a cane, will be alerted to the presence of an overhanging obstruction, despite the fact that no obstruction can be detected by the sweeping movement of the cane by the individual as he moves along a path of travel.

If both first distance sensor 14 and second distance sensor 16 are activated, microcontroller 18 will not activate vibratory motor 44, thereby avoiding signaling an individual when the obstruction would be detected by the sweeping movement of a cane. As a consequence of selectively signaling the presence of an overhanging obstruction, an individual moving along a path of travel will be able to employ a conventional device, such as a cane, and avoid injury caused by collision with overhanging obstructions that would not be detected by conventional devices, and without being unnecessarily signaled by the device when the obstruction is one that would be detected by a conventional device.

In addition, microcontroller 18 can be programmed to vary the strength of the signal sent to vibratory motor 44, depending upon the distance of the overhanging obstruction or by the rate of its relative approach to the individual traveling along a particular path.

In another embodiment, microprocessor 18 can be programmed to learn that overhanging objects above a particular elevation relative to device 10 should not be treated as obstacles, thereby providing a ceiling, above which vibratory motor 44 is not activated by microcontroller 18, despite the fact that second distance sensor 16 detects no obstruction.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A device for signaling the presence of suspended or overhanging obstructions to a path of travel by an individual, comprising:
   a) a housing that can be worn by an individual;
   b) a first distance sensor on the housing that, when the housing is worn by the individual, is oriented to selectively detect a suspended or overhanging obstruction at an elevation above the housing;
   c) a second distance sensor on the housing that is oriented to selectively detect an object at the elevation of the housing;
   d) a logic circuit at the housing that is electrically connected to the first and second distance sensors, the logic circuit emitting a response if the first sensor above is activated, and not emitting a response if the first and second sensors are both activated; and
   e) a signaling device at the housing and electrically connected to the logic circuit, whereby the signaling device is activated by a response from the logic circuit, thereby selectively signaling the presence of a suspended or overhanging obstruction, wherein the signaling device includes a tactile feedback component that emits a signal, the strength of the signal being inversely proportional to the distance between the housing and the obstruction.

2. The device of claim 1, wherein the logic circuit is programmed to cancel the response after a predetermined period of time.

3. The devise of claim 1, wherein at least one of the first and second sensors is an ultrasonic distance detector.

4. The device of claim 3, wherein both of the first and second sensors are ultrasonic distance detectors.

5. The device of claim 4, wherein the first sensor is a wide-beam ultrasonic detector.

6. The device of claim 5, wherein the second sensor is a point-detecting ultrasonic detector.

7. The device of claim 1, wherein at least one of the first or second sensors is a laser-based distance detector.

* * * * *